United States Patent
Zhen et al.

(10) Patent No.: US 11,095,829 B2
(45) Date of Patent: Aug. 17, 2021

(54) APPARATUS AND METHOD FOR HIGH DYNAMIC RANGE (HDR) IMAGE CREATION OF DYNAMIC SCENES USING GRAPH CUT-BASED LABELING

(71) Applicant: Samsung Electronics Co., Ltd., Suwon-si (KR)

(72) Inventors: Ruiwen Zhen, Allen, TX (US); John W. Glotzbach, Allen, TX (US); Hamid R. Sheikh, Allen, TX (US); Ibrahim Pekkucuksen, Plano, TX (US); Zhen Tong, Allen, TX (US); Long N. Le, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 16/544,008

(22) Filed: Aug. 19, 2019

(65) Prior Publication Data

US 2020/0396370 A1    Dec. 17, 2020

Related U.S. Application Data

(60) Provisional application No. 62/859,781, filed on Jun. 11, 2019.

(51) Int. Cl.
*H04N 5/235* (2006.01)
*G06T 5/40* (2006.01)
(Continued)

(52) U.S. Cl.
CPC ........... *H04N 5/2355* (2013.01); *G06T 5/009* (2013.01); *G06T 5/40* (2013.01); *G06T 5/50* (2013.01)

(58) Field of Classification Search
CPC ......... H04N 5/2355; G06T 5/009; G06T 5/40; G06T 5/50
(Continued)

(56) References Cited

U.S. PATENT DOCUMENTS

| 7,239,805 B2 | 7/2007 | Uyttendaele et al. |
| 7,443,443 B2 | 10/2008 | Raskar et al. |

(Continued)

FOREIGN PATENT DOCUMENTS

| CN | 102665034 A | 9/2012 |
| CN | 103793885 B | 7/2016 |

(Continued)

OTHER PUBLICATIONS

Kim et al., "Online Video Debluning via Dynamic Temporal Blending Network", Computer Vision Foundation, Apr. 2017, pp. 4038-4047.

(Continued)

*Primary Examiner* — Usman A Khan

(57) ABSTRACT

A method includes obtaining multiple image frames of a scene using at least one sensor of an electronic device. The multiple image frames include a first image frame and a second image frame having a longer exposure than the first image frame. The method also includes generating a label map that identifies pixels in the multiple image frames that are to be used in an image. The method further includes generating the image of the scene using the pixels extracted from the image frames based on the label map. The label map may include multiple labels, and each label may be associated with at least one corresponding pixel and may include a discrete value that identifies one of the multiple image frames from which the at least one corresponding pixel is extracted.

25 Claims, 12 Drawing Sheets

(51) Int. Cl.
  *G06T 5/50* (2006.01)
  *G06T 5/00* (2006.01)
(58) Field of Classification Search
  USPC .................................................... 348/229.1
  See application file for complete search history.

(56) References Cited

U.S. PATENT DOCUMENTS

| | | | |
|---|---|---|---|
| 7,962,030 | B2 | 6/2011 | Trevelyan |
| 8,248,481 | B2 | 8/2012 | Savidge |
| 8,525,900 | B2 | 9/2013 | Garten |
| 8,570,396 | B2 | 10/2013 | Rapaport |
| 8,848,063 | B2 | 9/2014 | Jo et al. |
| 8,953,094 | B2 | 2/2015 | Baer |
| 9,024,951 | B2 | 5/2015 | Frank et al. |
| 9,081,257 | B2 | 7/2015 | Miyazaki |
| 9,330,446 | B2 | 5/2016 | Park |
| 9,438,809 | B2 | 9/2016 | Sheikh et al. |
| 9,456,144 | B2 | 9/2016 | Miyazaki |
| 9,571,745 | B2 | 2/2017 | Mahowald |
| 10,097,765 | B2 | 10/2018 | Sheikh et al. |
| 2010/0066817 | A1 | 3/2010 | Zomet et al. |
| 2014/0002694 | A1* | 1/2014 | Levy .................. G06T 1/20 348/239 |
| 2016/0259994 | A1 | 9/2016 | Ravindran et al. |
| 2016/0267333 | A1 | 9/2016 | Jung et al. |
| 2017/0019608 | A1* | 1/2017 | Ono .................. H04N 5/243 |
| 2017/0201692 | A1 | 7/2017 | Wu |
| 2018/0025257 | A1 | 1/2018 | van den Oord et al. |
| 2018/0137643 | A1 | 5/2018 | Wang |
| 2018/0192098 | A1 | 7/2018 | Pekkucuksen et al. |

FOREIGN PATENT DOCUMENTS

| | | | |
|---|---|---|---|
| CN | 106934769 | A | 7/2017 |
| JP | 2007228099 | A | 9/2007 |
| JP | 2012119840 | A | 6/2012 |
| JP | 2016019196 | A | 2/2016 |
| JP | 6333095 | B2 | 5/2018 |
| KR | 1020160127606 | A | 11/2016 |
| KR | 101699919 | B1 | 1/2017 |

OTHER PUBLICATIONS

Joshi et al., "Seeing Mt. Rainier: Lucky Imaging for Multi-Image Denoising, Sharpening, and Haze Removal", 2010 IEEE International Conference on Computational Photography (ICCP), Mar. 2010, 8 pages.

Kalantari et al. "Deep High Dynamic Range Imaging of Dynamic Scenes", ACM Transactions on Graphics, vol. 36, No. 4, Article 144, Jul. 2017, 12 pages.

Tezcan, "Motion Estimation Using Convolutional Neural Networks", Boston University, Department of Electrical and Computer Engineering, Technical Report No. ECE-2017-04, Dec. 2017, 30 pages.

Gelfand et al., "Multi-exposure Imaging on Mobile Devices", MM'10, Oct. 2010, pp. 823-826.

Kingma et al., "Adam: A Method for Stochastic Optimization", ICLR 2015, Dec. 2014,15 pages.

Hasinoff et al., "Burst Photography for High Dynamic Range and Low-Light Imaging on Mobile Cameras", ACM Trans. Graph., vol. 35, No. 6, Article 192, Nov. 2016, 12 pages.

Fischer et al., "FlowNet: Learning Optical Flow with Convolutional Networks", May 2015, 13 pages.

Ilg et al., "FlowNet 2.0: Evolution of Optical Flow Estimation with Deep Networks", University of Freiburg, Germany, Dec. 2016, 16 pages.

Zhen et al., "System and Method for Compositing High Dynamic Range Images", U.S. Appl. No. 16/277,630, filed Feb. 15, 2019, 52 pages.

Le et al., "Apparatus and Method for Generating Low-Light Images With Improved Bokeh Using Mobile Electronic Device", U.S. Appl. No. 16/278,581, filed Feb. 18, 2019, 52 pages.

Hu et al., "Techniques for Convolutional Neural Network-Based Multi-Exposure Fusion of Multiple Image Frames and for Deblurring Multiple Image Frames", U.S. Appl. No. 16/278,512, filed Feb. 18, 2019, 81 pages.

Le et al., "Apparatus and Method for Capturing and Blending Multiple Images for High-Quality Flash Photography Using Mobile Electronic Device", U.S. Appl. No. 16/278,543, filed Feb. 18, 2019, 58 pages.

International Search Report of the International Searching Authority in connection with International Patent Application No. PCT/KR2020/007610 dated Sep. 25, 2020, 3 pages.

* cited by examiner

APPARATUS AND METHOD FOR HIGH DYNAMIC RANGE (HDR) IMAGE CREATION OF DYNAMIC SCENES USING GRAPH CUT-BASED LABELING

CROSS-REFERENCE TO RELATED APPLICATION AND PRIORITY CLAIM

This application claims priority under 35 U.S.C. § 119(e) to U.S. Provisional Patent Application No. 62/859,781 filed on Jun. 11, 2019. This provisional application is hereby incorporated by reference in its entirety.

TECHNICAL FIELD

This disclosure relates generally to image capturing systems. More specifically, this disclosure relates to an apparatus and method for high dynamic range (HDR) image creation of dynamic scenes using graph cut-based labeling.

BACKGROUND

Many mobile electronic devices, such as smartphones and tablet computers, include cameras that can be used to capture still and video images. While convenient, cameras on mobile electronic devices typically suffer from a number of shortcomings. For example, cameras on mobile electronic devices often capture images with under-exposed or over-exposed regions, such as when capturing images of natural scenes or images of other scenes having brighter and darker regions. This is typically because image sensors in the cameras have limited dynamic range. While it is possible to capture multiple image frames of a scene and then combine the "best" parts of the image frames to produce a final image, producing a final image from a set of image frames is a challenging process, particularly for dynamic scenes in which movement is occurring within the scene.

SUMMARY

This disclosure provides an apparatus and method for high dynamic range (HDR) image creation of dynamic scenes using graph cut-based labeling.

In a first embodiment, a method includes obtaining multiple image frames of a scene using at least one sensor of an electronic device. The multiple image frames include a first image frame and a second image frame having a longer exposure than the first image frame. The method also includes generating a label map that identifies pixels in the multiple image frames that are to be used in an image. The method further includes generating the image of the scene using the pixels extracted from the image frames based on the label map.

In a second embodiment, an electronic device includes at least one sensor and at least one processing device. The at least one processing device is configured to obtain multiple image frames of a scene using the at least one sensor. The multiple image frames include a first image frame and a second image frame having a longer exposure than the first image frame. The at least one processing device is also configured to generate a label map that identifies pixels in the multiple image frames that are to be used in an image. The at least one processing device is further configured to generate the image of the scene using the pixels extracted from the image frames based on the label map.

In a third embodiment, a non-transitory machine-readable medium contains instructions that when executed cause at least one processor of an electronic device to obtain multiple image frames of a scene using at least one sensor of the electronic device. The multiple image frames include a first image frame and a second image frame having a longer exposure than the first image frame. The medium also contains instructions that when executed cause the at least one processor to generate a label map that identifies pixels in the multiple image frames that are to be used in an image. The medium further contains instructions that when executed cause the at least one processor to generate the image of the scene using the pixels extracted from the image frames based on the label map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
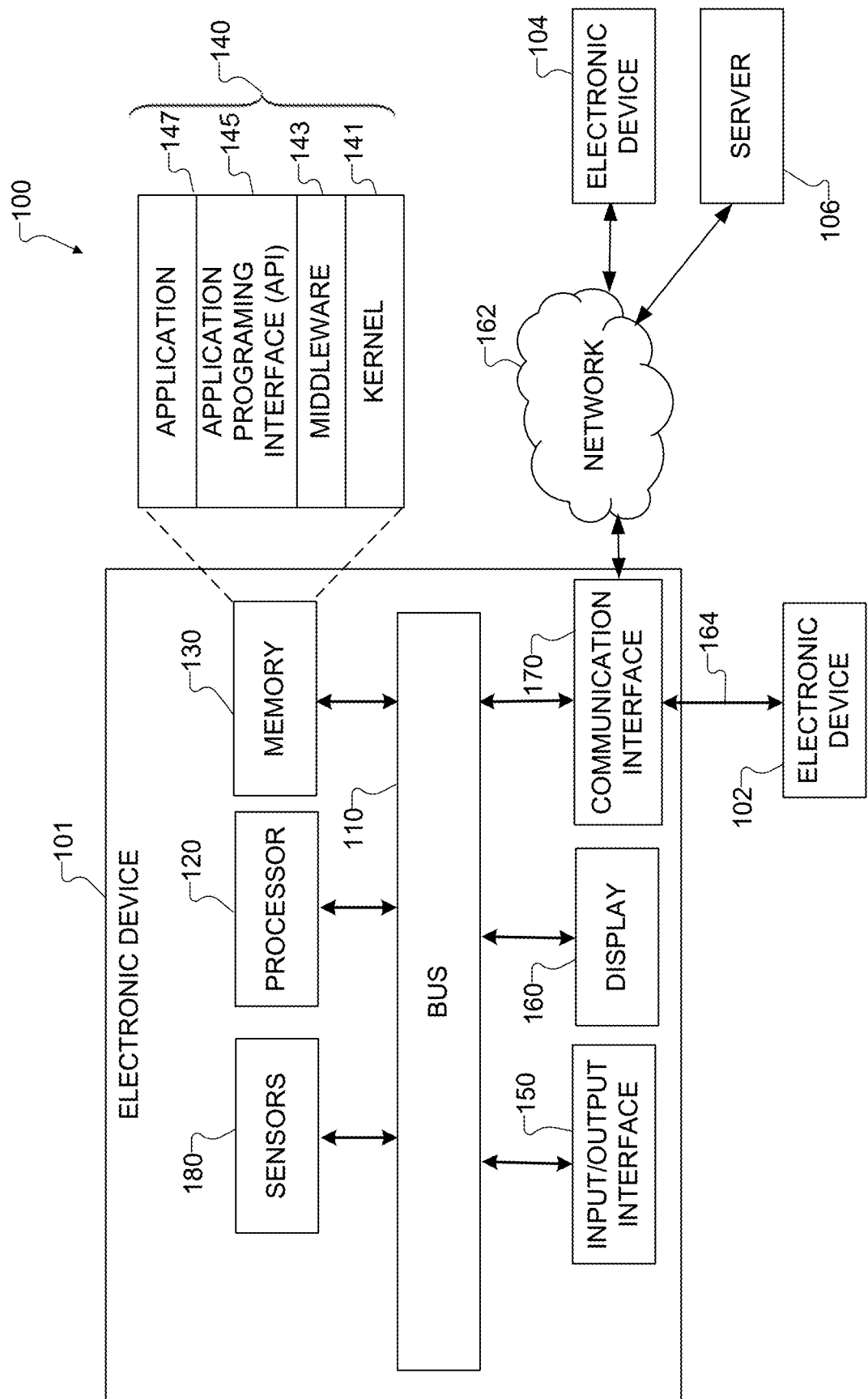
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings. For example, cameras in mobile electronic devices often capture images with under-exposed or over-exposed regions, typically because image sensors in the cameras have limited dynamic range. It is possible to capture multiple image frames of a scene and then combine different portions of the image frames, but one common problem often faced here involves detecting inconsistencies among the image frames and discarding potential ghost pixels while maximally recovering over-saturated or under-saturated details. Some prior techniques analyze differences in image frames by dividing the image frames into tiles, which often represent different rectangular areas of the image frames. However, these approaches typically lead to the formation of tiling effects or blocking artifacts, which refer to noticeable image discontinuities along boundaries of the tiles in a final image. Other prior techniques analyze differences in image frames based on histogram matching to identify moving objects. However, these approaches are often based only on motion, not other factors related to the image frames. All of these approaches also typically cannot deal with challenging problems such as occluded saturation recovery, which refers to the recovery of image details in saturated regions of one or more image frames using image details from one or more other image frames when at least one of the saturated regions is occluded (blocked) by a moving object in some of the image frames.

This disclosure provides various techniques for capturing multiple image frames of a scene at different exposures and processing the image frames to produce at least one label map. For example, in some embodiments, an image frame captured using an automatic exposure or other longer exposure and at least one image frame captured using a shorter exposure (compared to the automatic exposure) can be captured and analyzed. Each label map identifies which pixels in different image frames will be used to generate a composite or final image of the scene. The label map(s) can therefore be used to combine different input image frames into a composite or final image having high dynamic range (HDR). The identification of which pixels to use from each input image frame is regarded as a labeling problem here, and different parts of the input image frames can be stitched together using the label map(s) to produce the composite or final image.

Each label map may contain discrete values that identify the specific image frame from which each pixel is extracted to produce the composite or final image, such as when each value in the label map has one of two values when two image frames are being combined or one of three values when three image frames are being combined. Thus, for instance, each value in a label map may represent an image number or other identifier of the image frame from which the associated pixel will be extracted. The values in a label map can be generated by minimizing a well-designed cost function that jointly considers a motion metric (which indicates whether pixels in an image frame are associated with a moving object) and a well-exposedness metric (which indicates whether pixels in an image frame are from well-exposed, over-exposed, or under-exposed regions). The cost function also considers a smoothness metric that encourages discontinuities in the label map to avoid image difference areas and to fall along object edges or boundaries.

Among other things, the techniques disclosed in this patent document can be used to improve the image quality of images captured using cameras in mobile electronic devices or other devices. For example, these techniques help to preserve the dynamic range of multiple input image frames and help to avoid the creation of ghost artifacts by improving the isolation of moving objects compared to traditional de-ghosting techniques. Also, these techniques help to localize motion areas more effectively since the cost function used here can encourage discontinuities in a label map to avoid areas where image frames are different and to fall along edges or boundaries of moving objects and other objects. This typically allows pixels associated with each object to be extracted from a single image frame rather than from multiple image frames, which helps to avoid the formation of tiling effects or blocking artifacts and other artifacts in the composite or final image that is generated. Further, the cost function used here can achieve a balance between motion and well-exposedness in an improved or optimized manner when selecting pixels from the image frames. Moreover, these techniques can be used to recover image data in one or more portions of image frames that are over-exposed or under-exposed, even when those portions are occluded in one or more of the image frames due to motion, using a specified capture order for the image frames. In addition, these approaches can be extended to various numbers of images and different combinations of exposure times with minor modifications to the cost function.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) to generate HDR images of dynamic scenes using graph cut-based labeling.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
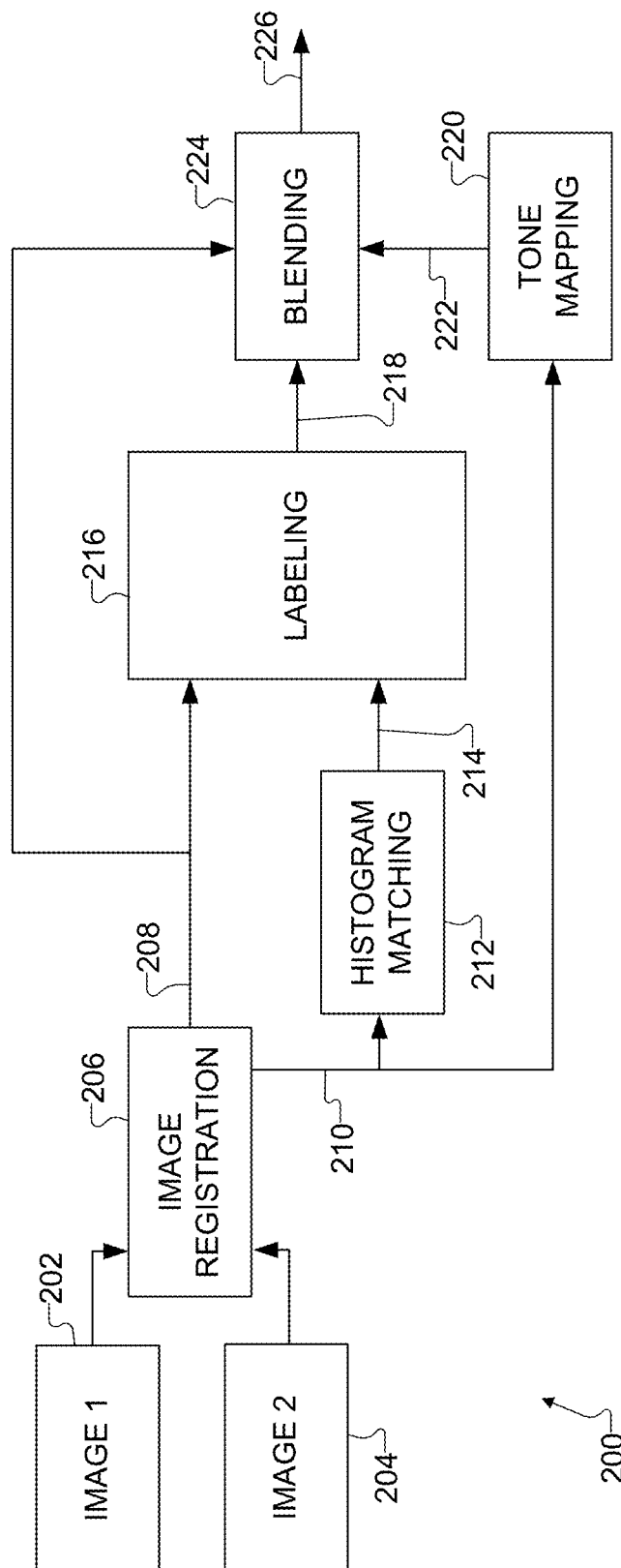
FIG. 2 illustrates an example process for high dynamic range (HDR) image creation of a dynamic scene using graph cut-based labeling in accordance with this disclosure.

FIG. 2 illustrates an example process 200 for high dynamic range (HDR) image creation of a dynamic scene using graph cut-based labeling in accordance with this disclosure. For ease of explanation, the process 200 shown in FIG. 2 is described as being performed using the electronic device 101 shown in FIG. 1. However, the process 200 shown in FIG. 2 could be used with any other suitable electronic device and in any suitable system.

The process 200 is generally used to capture multiple image frames of a scene at different exposures and process the image frames (as described in more detail below) to generate at least one label map. Each label map contains multiple values, where each value identifies the image frame from which a corresponding pixel will be extracted and used to produce a composite or final image of the scene. This allows improved images to be generated with greater dynamic range.

As shown in FIG. 2, the process 200 involves the capture of multiple image frames 202 and 204. In this example, there are two image frames being captured and processed, although more than two image frames may also be used. The image frames 202 and 204 are captured at different exposures, such as when one image frame 202 is captured using an automatic exposure (referred to here as an "auto-exposure") or other longer exposure and the image frame 204 is captured using a shorter exposure (compared to the automatic or longer exposure). An automatic exposure generally refers to an exposure that is automatically determined by a camera or other device, typically with little or no user input. In some embodiments, for example, a user is allowed to specify an exposure mode (such as portrait, landscape, sports, or other modes), and the automatic exposure can be generated based on the selected exposure mode without any other user input. Each exposure setting is typically associated with different settings for the camera, such as different apertures, shutter speeds, and camera sensor sensitivities. A shorter-exposure image frame is typically darker, lacks image details, and has more noise compared to an auto-exposure or other longer-exposure image frame. As a result, the shorter-exposure image frame may include one or more regions that are under-exposed, while the auto-exposure or other longer-exposure image frame may include one or more regions that are over-exposed. Note that while often described below as involving the use of an auto-exposure image frame and at least one shorter-exposure image frame, the techniques described in this patent document may be used with any suitable combination of image frames captured using different exposures.

In some instances, during a capture operation, the processor 120 can control the camera of the electronic device 101 so that the image frames 202 and 204 are captured rapidly, such as in a burst mode. A capture request that triggers the capture of the image frames 202 and 204 represents any suitable command or input indicating a need or desire to capture an image of a scene using the electronic device 101. For example, the capture request could be initiated in response to a user's pressing of a "soft" button presented on the display 160 or the user's pressing of a "hard" button. In this example, two image frames 202 and 204 are captured in response to the capture request, although more than two images could be captured here. Also, the image frames 202 and 204 here may be produced in any suitable manner, such as where each image frame is simply captured by a camera or where a multiple-frame fusion technique is used to capture multiple initial image frames and combine them into one or more of the image frames 202 and 204.

During subsequent operations, one image frame 202 or 204 can be used as a reference image frame, and the other image frame 204 or 202 can be used as a non-reference image frame. Depending on the circumstances, the reference image frame may represent the auto-exposure or other longer-exposure image frame, or the reference image frame may represent the shorter-exposure image frame. In some embodiments, the auto-exposure or other longer-exposure image frame may be used as the reference image frame by default, since this typically allows the image frame with greater image details to be used more when generating a composite or final image of a scene. However, as described below, there may be some instances where this is not desirable (such as due to the creation of image artifacts), in which case the shorter-exposure image frame may be selected as the reference image frame.

As shown in FIG. 2, the image frames 202 and 204 are provided to an image registration operation 206, which generally operates to align the image frames 202 and 204 and produce aligned image frames 208 and 210. For example, the image registration operation 206 may modify the non-reference image frame so that particular features in the non-reference image frame align with corresponding features in the reference image frame. In this example, the aligned image frame 208 represents an aligned version of the reference image frame, and the aligned image frame 210 represents an aligned version of the non-reference image frame. Alignment may be needed to compensate for misalignment caused by the electronic device 101 moving or rotating in between image captures, which causes objects in the image frames 202 and 204 to move or rotate slightly (as is common with handheld devices). The image frames 202 and 204 here can be aligned both geometrically and photometrically. In some embodiments, the image registration operation 206 can use global Oriented FAST and Rotated BRIEF (ORB) features and local features from a block search to align the image frames, although other implementations of the image registration operation 206 could also be used. Note that the reference image frame here may or may not be modified during the alignment, and the non-reference image frame could represent the only image frame that is modified during the alignment.

The aligned image frame 210 (the non-reference image frame) is provided to a histogram matching operation 212. The histogram matching operation 212 generally operates to match a histogram of the non-reference image frame to a histogram of the reference image frame, such as by applying a suitable transfer function to the aligned image frame 210. For example, the histogram matching operation 212 may operate to make the brightness level generally equal for both aligned image frames 208 and 210. This may typically involve increasing the brightness of the shorter-exposure image frame to substantially match the brightness of the auto-exposure or other longer-exposure image frame, although the converse may occur. This results in the generation of a pre-processed aligned image frame 214 associated with the aligned image frame 210.

The aligned image frame 208 and the pre-processed aligned image frame 214 are provided to a labeling operation 216, which generally operates to identify different pixels or areas from the image frames 208 and 214 to be extracted and combined. The labeling operation 216 generates at least one label map 218, which contains discrete values (such as image numbers or other image identifiers) indicating whether each pixel in a composite or final image being generated is extracted from the image frame 208 or from the image frame 214. As described in more detail below, the labeling operation 216 supports the use of a data cost function and a smoothness cost function. The data cost function generally considers to what extent a non-reference image frame (the image frame 214 in this example) is consistent with a reference image frame (the image frame 208 in this example). The data cost function generally considers both (i) a motion metric indicating whether pixels in an image frame are associated with a moving object and (ii) a well-exposedness metric indicating whether pixels in an image frame are from well-exposed, over-exposed, or under-exposed regions. The smoothness cost function generally considers how each pixel's neighbors are labeled so that cuts in the label map tend to naturally follow object boundaries in the image frames.

A tone mapping operation 220 generally operates to apply a global tone mapping curve to the aligned image frame 210 in order to brighten darker areas and increase image contrast in the aligned image frame 210. Various techniques for tone mapping are known in the art. The output of the tone mapping operation 220 is a tone-matched aligned image frame 222, which (ideally) has the same or substantially similar tone as the aligned image frame 208.

A blending operation 224 blends or otherwise combines the pixels from the image frames 208 and 222 based on the label map(s) 218 in order to produce at least one final image 226 of a scene. The final image 226 generally represents a blend of the image frames 208 and 222, where each pixel in the final image 226 is extracted from either the image frame 208 or the image frame 222 (depending on the corresponding value in the label map 218). Of course, additional image processing operations can occur once the proper pixels are extracted from the image frames 208 and 222 and used to form an image. Ideally, the final image 226 has little or no artifacts and improved image details, even in areas where at least one of the image frames 202 and 204 were over-exposed or under-exposed. Any suitable technique can be used to blend or otherwise combine the image frames 208 and 222 based on the label map(s) 218, such as a pyramid blending technique or other blending techniques, to merge different parts of the image frames 208 and 222.

The following description describes specific example techniques for implementing the labeling operation 216. Note that the following techniques are examples only and that the labeling operation 216 can be implemented in any other suitable manner. For example, specific equations are described below for defining various metrics and cost functions that can be used by the labeling operation 216 in specific implementations. However, other equations may be used to define suitable metrics and/or cost functions for the labeling operation 216 in other embodiments.

As described above, the labeling operation 216 generates at least one label map 218, which identifies the pixels to be used from different image frames by the blending operation 224 to generate the final image 226. Stated another way, an intensity value of each pixel p in the final image 226 comes from one of two input image frames, depending on the label for that pixel in the label map 218. In the following discussion, an index value i is used to identify one of two image frames, where i=1 indicates a pixel is to be extracted from the reference image frame (image frame 208) by the blending operation 224 and i=0 indicates a pixel is to be extracted from the non-reference image frame (image frame 210 as processed into image frame 222) by the blending operation 224.

If the intensity value from an image frame $I_i$ is used, i can be thought of as representing the label of the associated pixel p. To determine a label $\Lambda_p$ for any pixel p, an overall cost function can be defined and used by the labeling operation 216, where the overall cost function includes, incorporates, or is otherwise based on (i) a data cost function that encourages scene consistency and well-exposedness and (ii) a smoothness cost function that encourages smooth transitions and cuts along object boundaries. The label map 218 is generated by the labeling operation 216 by minimizing the overall cost function, which can be done by performing graph-cut optimization. The following discussion now describes an example data cost function and an example smoothness cost function in detail.

With respect to the data cost portion of the overall cost function, assume that an auto-exposure image frame (or other longer-exposure image frame) is selected as the reference image frame. In that case, any pixels that a label map 218 identifies as coming from the shorter-exposure image frame (the non-reference image frame) should be consistent with the reference image frame to avoid misalignment, ghost artifacts, or double contents. This criterion is referred to as "scene consistency." Also, only well-exposed contents from the non-reference image frame should be merged into the final image 226, since significant contribution from the lower-quality non-reference image frame can degrade the image quality of the final image 226. This criterion is referred to as "well-exposedness."

To define a scene consistency metric P, when an auto-exposure or other longer-exposure image frame $I_1$ is used as the reference image frame, its scene consistency metric P can be defined as:

$$P(I_1(p))=1 \qquad (1)$$

For any pixel p labeled as i=0 (meaning the pixel comes from the non-reference shorter-exposure image frame $I_0$), the scene consistency metric P for that pixel can be defined as:

$$P(I_0(p)) = \left(e^{-\frac{D(p)^2}{2\sigma_c^2}}\right)^2 \qquad (2)$$

Here, $I_0(p)$ and $I_1(p)$ represent a specific pixel p in an image frame $I_0$ (image frame 210) and an image frame $I_1$ (image frame 208), respectively. Also, D(p) represents a difference between the specific pixel p in the image frames $I_0$ and $I_1$, which could be calculated as:

$$D_y=|NY_0-Y_1| \qquad (3)$$

$$D_{cb}=|NCb_0-Cb_1|, D_{cr}=|NCr_0-Cr_1| \qquad (4)$$

$$S=(Cb_0-128)^2+(Cr_0-128)^2 \qquad (5)$$

$$D=D_y+(D_{cb}+D_{cr})/S \qquad (6)$$

In these equations, $NY_0$ represents luminance values in the histogram-matched version of the non-reference image frame $I_0$ (meaning luminance values in the image frame 214), and $Y_1$ represents luminance values in the reference image frame $I_1$ (meaning luminance values in the image frame 208). Also, $Cb_0$ and $Cr_0$ represent chrominance values in the non-reference image frame $I_0$ (meaning chrominance values in the image frame 210), $NCb_0$ and $NCr_0$ represent chrominance values in the histogram-matched version of the non-reference image frame $I_0$ (meaning chrominance values in the image frame 214), and $Cb_1$ and $Cr_1$ represent chrominance values in the reference image frame $I_1$ (meaning chrominance values in the image frame 208). In addition, S computes color saturation of the image frame $I_0$, in this example by subtracting a specific value of 128 from the $Cb_0$ and $Cr_0$ values and summing the squares of the resulting differences (although a value other than 128 may be used here). The color saturation value is used as the denominator of the chrominance difference signal in Equation (6) to allow more chrominance difference on higher-color saturation areas that bear less accuracy in histogram matching. The parameter $\sigma_c$ in Equation (2) controls the tolerance of the image difference. If $\sigma_c$ is higher, the scene consistency values for pixels in the image frame $I_0$ are higher, which indicates more pixels will be labeled as i=0. If $\sigma_c$ is lower, the scene consistency values for pixels in the image frame $I_0$ are lower, which indicates fewer pixels will be labeled as i=0. To avoid cut-through artifacts on people's faces in image frames, the difference signal D can be increased (such as for a rectangular area containing a person's face) to make sure that area is labeled as coming from the reference image frame.

To define a well-exposedness metric W, luminance values can be used to evaluate the well-exposedness metric W for a pixel p in the image frames $I_0$ and $I_1$ as follows:

$$W(I_0(p)) = L_0(Y_0(p)) \quad (7)$$

$$W(I_1(p)) = L_1(Y_1(p)) \quad (8)$$

Here, $Y_0(p)$ and $Y_1(p)$ represent the luminance values of the pixel p in the image frames $I_0$ and $I_1$, respectively. Also, $L_0()$ and $L_1()$ are functions that use the luminance values of the pixel to generate the values of the well-exposedness metric W for the pixel in the image frames $I_0$ and $I_1$, respectively. In some embodiments, one possible implementation of the well-exposedness metric W is to define the functions $L_0()$ and $L_1()$ to compute how close a pixel's luminance value is to the pixel's intensity value using a Gaussian curve. In other embodiments, one can start from a simpler metric (such as when $L_0$ and $L_1$ are identity functions) since the signal-to-noise ratio (SNR) increases as a measured luminance value increases, so the luminance value itself can be used as a well-exposedness indicator. However computed, when a pixel's intensity value is saturated, the pixel can be down-weighted to facilitate saturation region recovery, which can be expressed as follows:

$$W(I_0(p)) = L_0(Y_0(p)) \quad (9)$$

$$W(I_1(p)) = \begin{cases} M & \text{if } I_1(p) \text{ is saturated} \\ Y_1(p) & \text{otherwise} \end{cases} \quad (10)$$

A saturation region $SAT_1$ of the image frame $I_1$ can be defined as:

$$SAT_1 = \max(I_{1R}, I_{1G}, I_{1B}) > E_s \quad (11)$$

where $I_{1R}$, $I_{1G}$, and $I_{1B}$ represent values in red, green, and blue channels of the image frame $I_1$ and $E_s$ represents a saturation threshold. For certain scenes (such as those including neon objects at night), luminance values are not typically high enough to trigger saturation detection, so the maximum value among the red, green, and blue channels can be used to mark the saturation regions. Here, a minimal weight M can be spatially-varying in some embodiments. For example, an entire image frame can be divided into small rectangular tiles, and a motion statistic ms can be computed for each tile. If the motion statistic ms is high, a large value for M can be used. If the motion statistic ms is low, a small value for M can be used. In other words, M provides an indication whether pixel values should be down-weighted to recover saturation details. An example of this can be expressed as:

$$M = \begin{cases} M1 & \text{if } ms < \beta_0 \\ M2 & \text{if } ms < \beta_1 \\ M3 & \text{if } ms < \beta_2 \\ M4 & \text{otherwise} \end{cases} \quad (12)$$

Note that M1<M2<M3<M4 and that $\beta_0<\beta_1<\beta_2$. Decreasing M1, M2, M3, and M4 or increasing $\beta_0$, $\beta_1$, and $\beta_2$ could increase contributions from the shorter-exposure image frame.

Based on the scene consistency metric P and the well-exposedness metric W defined above, a data cost function DC(p, i) for selecting image frame i as the label for each pixel p can be expressed as:

$$DC(p, i) = \frac{1}{P(I_i(p))W(I_i(p))} \quad (13)$$

Since DC is a cost, higher values signify less desirable labeling, so the cost is made inversely proportional to W and P. This data cost function DC(p, i) can be used to calculate data costs in the overall cost function used by the labeling operation 216.

With respect to the smoothness cost portion of the overall cost function, the data cost function described above acts as a penalty for selecting a given pixel based on information only at that pixel. In order to create a good transition from one image frame to another image frame in the label map 218 (meaning a good transition exists in the label map 218 when changing between pixels selected from image frame $I_0$ and pixels selected from image frame $I_1$), neighbor information of each pixel can be considered using a smoothness cost function. Thus, for each pixel p, denote each of its neighbors as p'. The labels applied to a pixel p and its neighbors p' can be expressed as $\Lambda_p=i$ and $\Lambda_{p'}=j$. If i≠j here, this indicates that a pixel p and a neighbor p' are labeled as coming from different image frames $I_0$ and $I_1$, and the smoothness cost SC over p and p' can be expressed as:

$$SC(p, p', i, j) = \frac{D(p) + D(p')}{\beta \partial_* Y_i(p) + \gamma \partial_* Y_j(p)} \quad (14)$$

If i=j here, this indicates that a pixel p and its neighbor p' are labeled as coming from the same image frame $I_0$ or so SC(p, p', i, j)=0. In some embodiments, for each pixel p, its four-point neighbors (directly above, directly below, directly right, and directly left) can be considered, although other embodiments might consider all eight pixels surrounding the pixel p or other groups of neighbors. If p' is a horizontal neighbor (to the left or right), $\partial_y$ is used to compute vertical edges. If p' is a vertical neighbor (above or below), $\partial_x$ is used to compute horizontal edges. An edge map in the smoothness cost aims to make any cut seams along object boundaries, and the values β and γ regularize the contribution of each edge map.

Based on the data cost function and the smoothness cost function described above, the overall cost function used by the labeling operation 216 can be expressed as follows. The overall cost function C represents the sum of two terms, namely (i) the data cost DC over all pixels p and (ii) the smoothness cost SC over all pairs of neighboring pixels p and p', which can be expressed as:

$$C(\lambda)=\lambda\Sigma_p DC(p,\Lambda_p)+\Sigma_{p,p'} SC(p,p',\Lambda_p,\Lambda_{p'}) \qquad (15)$$

The labeling operation 216 uses a graph-cut optimization to find the labels $\Lambda_p$ for all pixels p that minimize the cost function C in Equation (15). Various graph-cut optimization algorithms are known in the art and can be used. Here, λ is a parameter to balance between data costs and smoothness costs. If λ is large, the final labels are more consistent with data costs. If λ is small, smoothness costs dominate, and thus the label map 218 is smoother. The result of the graph-cut optimization is a set of labels $\Lambda_p$ for all pixels p, and those labels $\Lambda_p$ can be included in the resulting label map 218.

It should be noted that the operations 206, 212, 216, 220, 224 shown in FIG. 2 can be implemented in an electronic device 101 in any suitable manner. For example, in some embodiments, the operations shown in FIG. 2 can be implemented or supported using one or more software applications or other software instructions that are executed by the processor 120 of the electronic device 101. In other embodiments, at least some of the operations shown in FIG. 2 can be implemented or supported using dedicated hardware components. In general, the operations shown in FIG. 2 can be performed using any suitable hardware or any suitable combination of hardware and software/firmware instructions.

It should also be noted that the operations 206, 212, 216, 220, 224 shown in FIG. 2 are described above as being performed using a specific implementation of the electronic device 101, but a number of modifications can be made based on the actual electronic device 101 being used. For example, the electronic device 101 could include or use a single camera or multiple cameras. If a single camera is used, multiple image frames of a scene could be captured sequentially, such as in one or more fast bursts. If multiple cameras are used, it may be possible to capture multiple image frames concurrently or in an overlapping manner, such as by capturing multiple image frames of a scene at the same time but with different exposures using different cameras. If needed, multiple image frames of the scene could still be captured sequentially using at least one of the multiple cameras. Assuming the geometry of the multiple cameras is known ahead of time, this geometry can be used to help align the image frames captured by the cameras or perform other functions. Also, the electronic device 101 is described above as performing various operations using RGB image data. However, data in other domains (such as YUV data) could also be used or processed. Further, the techniques described in this patent document could be combined with other HDR image processing algorithms or temporal noise filtering algorithms (which use multiple image frames captured at the same exposure), such as in a software library used by the electronic device 101. This may allow a user of the electronic device 101 to select between different image processing algorithms or other algorithms, such as based on the specific situation or based on user preference.

Although FIG. 2 illustrates one example of a process for HDR image creation of a dynamic scene using graph cut-based labeling, various changes may be made to FIG. 2. For example, while shown as a specific sequence of operations, various operations shown in FIG. 2 could overlap, occur in parallel, occur in a different order, or occur any number of times. Also, the specific operations shown in FIG. 2 are examples only, and other techniques could be used to perform each of the operations shown in FIG. 2.

Figure 3A:
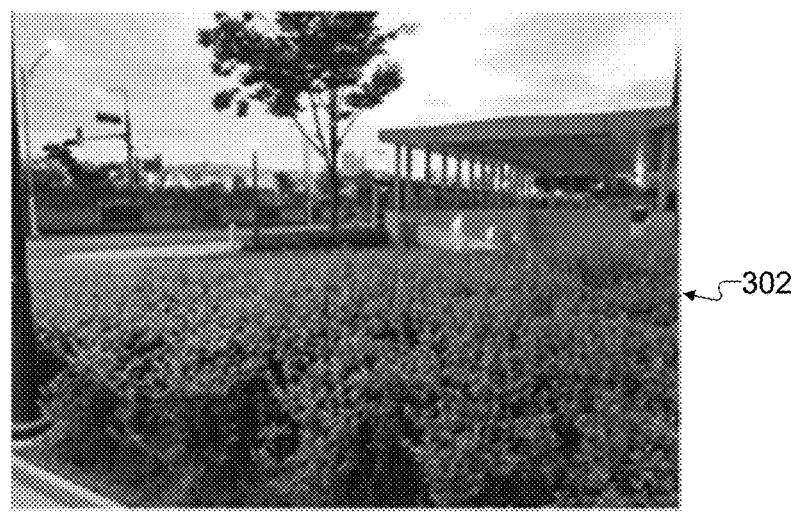
FIGS. 3A, 3B, and 3C illustrate an example generation of a label map for use in producing an HDR image of a dynamic scene in accordance with this disclosure.
Figure 3B:
Figure 3C:

FIGS. 3A, 3B, and 3C illustrate an example generation of a label map for use in producing an HDR image of a dynamic scene in accordance with this disclosure. In particular, FIGS. 3A, 3B, and 3C illustrate how the process 200 shown in FIG. 2 may be used to generate a label map for use in producing an HDR image of a dynamic scene. For ease of explanation, the generation of the label map here is described as being performed using the electronic device 101 of FIG. 1, although any other suitable electronic device in any suitable system may be used.

As shown in FIGS. 3A and 3B, two image frames 302 and 304 of a scene have been captured. In this particular example, the scene includes a sunset behind various natural objects (such as trees and bushes) and artificial structures (such as buildings, lampposts, and stoplights). The image frame 302 represents an auto-exposure image frame or other longer-exposure image frame captured of the scene, while the image frame 304 represents a shorter-exposure image frame captured of the scene. Because the image frame 302 has a longer exposure than the image frame 304, the image frame 302 is brighter and includes greater image detail in most areas, but the sky is over-exposed in the image frame 302. Because the image frame 304 has a shorter exposure than the image frame 302, the image frame 304 is darker and includes less image detail in most areas, but the sky is well-exposed in the image frame 304.

After the image frames 302 and 304 are pre-processed (such as by the image registration operation 206 and the histogram matching operation 212), the labeling operation 216 can process the resulting image frames to generate a label map 306 as shown in FIG. 3C. The label map 306 here includes only discrete values, namely one value (represented by the color white) to identify pixels in the pre-processed image frame 302 and another value (represented by the color black) to identify pixels in the pre-processed image frame 304. The white values in the label map 306 identify the pixels to be extracted from the pre-processed image frame 302 when producing a final image of the scene, and the black values in the label map 306 identify the pixels to be extracted from the pre-processed image frame 304 when producing the final image of the scene.

As can be seen in FIG. 3C, the white pixels in the label map 306 generally include the foreground objects and other relatively-close objects, such as the various natural objects and artificial structures in the scene. Given this particular scene, this is generally to be expected since the image frame 302 contains more image details than the image frame 304, at least with respect to these objects. The black pixels in the label map 306 generally include the sky in the scene's background. Again, given this particular scene, this is generally to be expected since the image frame 302 is over-exposed in the areas showing the sky, while the image frame 304 is well-exposed in the areas showing the sky. The final image of the scene will therefore include the pixels defining the foreground objects and other relatively-close objects from the pre-processed image frame 302 and the pixels defining the sky from the pre-processed image frame 304 based on the label map 306 shown here.

In addition, as can be seen in FIG. 3C, the labels in the label map 306 here have clear discontinuities along edges or boundaries of objects within the scene, such as the various natural objects and artificial structures. As a result, most or substantially all of the pixels in the final image showing the various natural objects and artificial structures will be extracted from a single image frame (the image frame 302 in this example), helping to avoid the creation of artifacts within these objects in the final image.

Figure 4A:
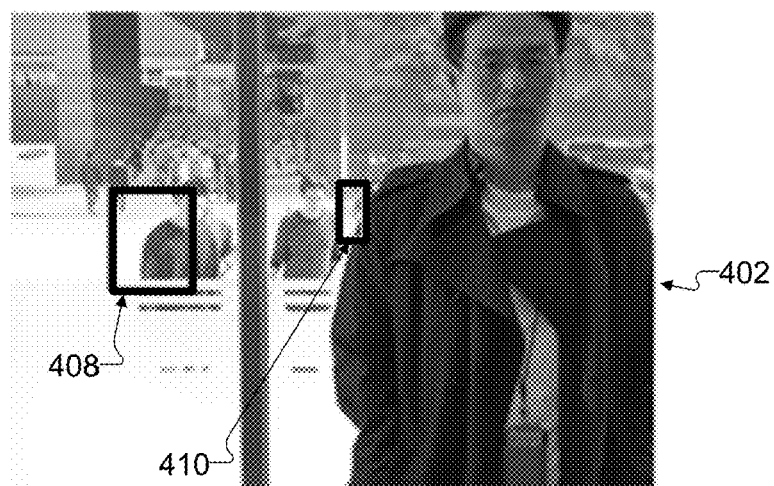
FIGS. 4A, 4B, and 4C illustrate another example generation of a label map for use in producing an HDR image of a dynamic scene in accordance with this disclosure.
Figure 4B:
Figure 4C:
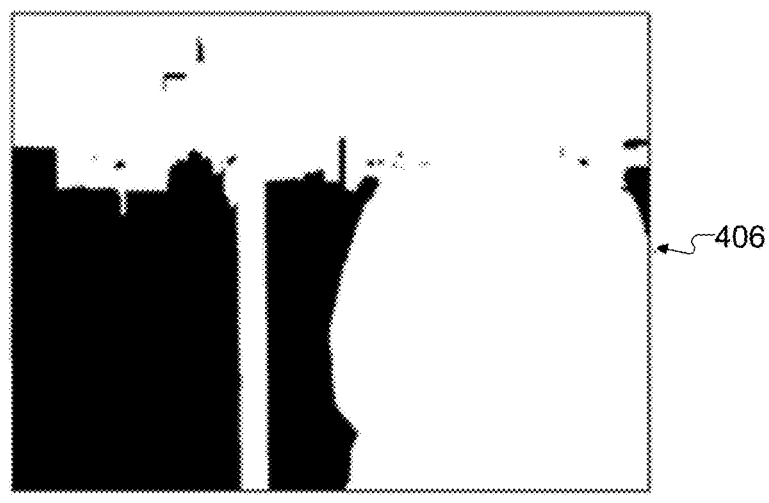

FIGS. 4A, 4B, and 4C illustrate another example generation of a label map for use in producing an HDR image of a dynamic scene in accordance with this disclosure. In particular, FIGS. 4A, 4B, and 4C illustrate how the process 200 shown in FIG. 2 may be used to generate a label map for use in producing an HDR image of a dynamic scene. For ease of explanation, the generation of the label map here is described as being performed using the electronic device 101 of FIG. 1, although any other suitable electronic device in any suitable system may be used.

In the example shown in FIGS. 3A, 3B, and 3C, the auto-exposure or other longer-exposure image frame 302 is used as the reference image frame during the process 200, and any areas of the image frame 302 containing motion could be replaced using corresponding areas of the non-reference image frame 304. However, there may be various situations in which one or more saturated areas in the longer-exposure image frame are partially occluded by at least one moving object in the shorter-exposure image frame. An example of this is shown in FIGS. 4A and 4B, where two image frames 402 and 404 have been captured of a scene. The image frame 402 represents an auto-exposure image frame or other longer-exposure image frame captured of the scene, while the image frame 404 represents a shorter-exposure image frame captured of the scene. In this particular scene, a person is standing inside a structure in the image foreground, while people are walking in the image background (which is outside and bright). Two boxes 408 and 410 in the image frame 402 identify areas where the image frame 402 is saturated but where the moving people in the background have occluded those same areas in the image frame 404.

When this occurs, it is generally not possible to recover image details for the over-exposed area(s) of the longer-exposure image frame 402 from the shorter-exposure image frame 404. Stated another way, the boxes 408 and 410 identify saturated areas of the image frame 402 where one would ordinarily wish to recover image details from the image frame 404, but this is not possible due to motion in the scene. In cases such as this where a scene has one or more saturated regions that are occluded by movement, the reference image frame can be switched from the longer-exposure image frame to the shorter-exposure image frame. In this particular example, this would involve the process 200 using the image frame 404 as the reference image frame and using the image frame 402 as the non-reference image frame.

In these embodiments, various equations described above can be modified to support the reversal of the reference and non-reference image frames. For example, the data cost can be adapted to the new reference image frame, and the well-exposedness metric can be expressed as:

$$W(I_0(p)) = Y_0(p) \tag{16}$$

$$W(I_1(p)) = \begin{cases} M & \text{if } I_1(p) \text{ is saturated} \\ Y_1(p) & \text{otherwise} \end{cases} \tag{17}$$

The well-exposedness metric for the shorter-exposure image frame $I_0$ remains the same, while the well-exposedness metric for the longer-exposure image frame $I_1$ can be simplified to no longer back off due to the motion statistics ms. The scene consistency metric is also swapped between the longer-exposure and shorter-exposure image frames to compensate for the lower well-exposedness value of the shorter-exposure image frame, thereby favoring moving regions of the shorter-exposure image frame. This can be expressed as:

$$P(I_0(p)) = 1 \tag{18}$$

$$P(I_1(p)) = \left(e^{-\frac{D_{01}(p)^2}{2\sigma_c^2}}\right)^2 \tag{19}$$

A label map 406 generated using this approach is shown in FIG. 4C. As can be seen in FIG. 4C, the white pixels in the label map 406 generally include the person standing in the foreground and part of the background, and the black pixels in the label map 406 generally include the part of the background containing significant movement. Once again, the labels in the label map 406 here have clear discontinuities along edges or boundaries of objects within the scene.

Figure 5A:
FIGS. 5A and 5B illustrate an example artifact avoidance obtainable through reference image frame selection in accordance with this disclosure.
Figure 5B:
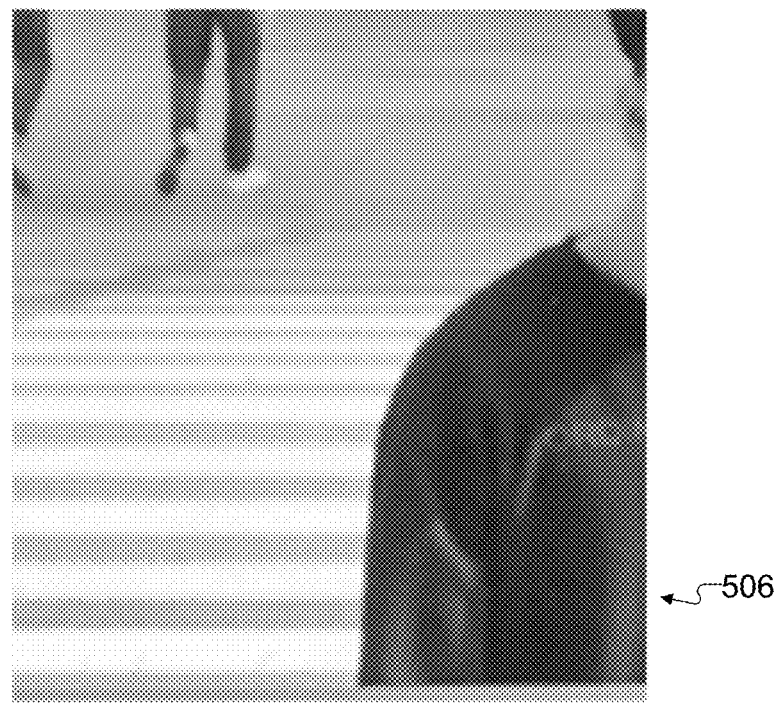

FIGS. 5A and 5B illustrate an example artifact avoidance obtainable through reference image frame selection in accordance with this disclosure. In particular, FIG. 5A illustrates a portion 502 of a final image generated using the process 200 shown in FIG. 2, where the image frame 402 is used as a reference image frame and the image frame 404 is used as a non-reference image frame. As can be seen in FIG. 5A, an artifact 504 is present on the left side of a person walking in the background of the scene. This artifact 504 is caused by the fact that the background is saturated in the image frame 402 being used as the reference image, but that portion of the scene is also occluded in the shorter-exposure image frame 404 being used as the non-reference image. Note that while the artifact 504 here represents a gray area, other types of artifacts may exist depending (among other things) on the type of blending or other combination performed by the blending operation 224.

FIG. 5B illustrates a portion 506 of a final image generated using the process 200 shown in FIG. 2, where the image frame 404 is used as a reference image frame and the image frame 402 is used as a non-reference image frame. As can be seen in FIG. 5B, the artifact 504 is not present on the left side of the person walking in the background of the scene. This is because the image frame 404 is used as the reference image frame, and that area of the scene in the final image comes from the shorter-exposure image frame 404 that is not over-saturated. As a result, using the longer-exposure image frame as the non-reference image frame is one mechanism for occluded saturation region recovery. This shows that the process 200 shown in FIG. 2 can be adapted to use either an auto-exposure or other longer-exposure image frame as the reference image frame or the non-reference image frame. It should be noted, however, that using the longer-exposure image frame as the non-reference image frame may result in a lower texture quality in the final image of the scene. This is due to the fact that more of the image details may be taken from the shorter-exposure image frame, which typically lacks some of the image details contained in the longer-exposure image frame.

Although FIGS. 3A through 5B illustrate various examples of label map generation and HDR image generation, various changes may be made to FIGS. 3A through 5B. For example, FIGS. 3A through 5B are merely meant to illustrate examples of the types of results that could be obtained using the approaches described in this disclosure. Obviously, images of scenes can vary widely, and the results obtained using the approaches described in this patent document can also vary widely depending on the circumstances. Also, the label maps shown in FIGS. 3C and 4C may vary even for the same images as shown in FIGS. 3A, 3B, 4A, and 4B, such as based on various parameters (like the λ parameter) described above.

Figure 6:
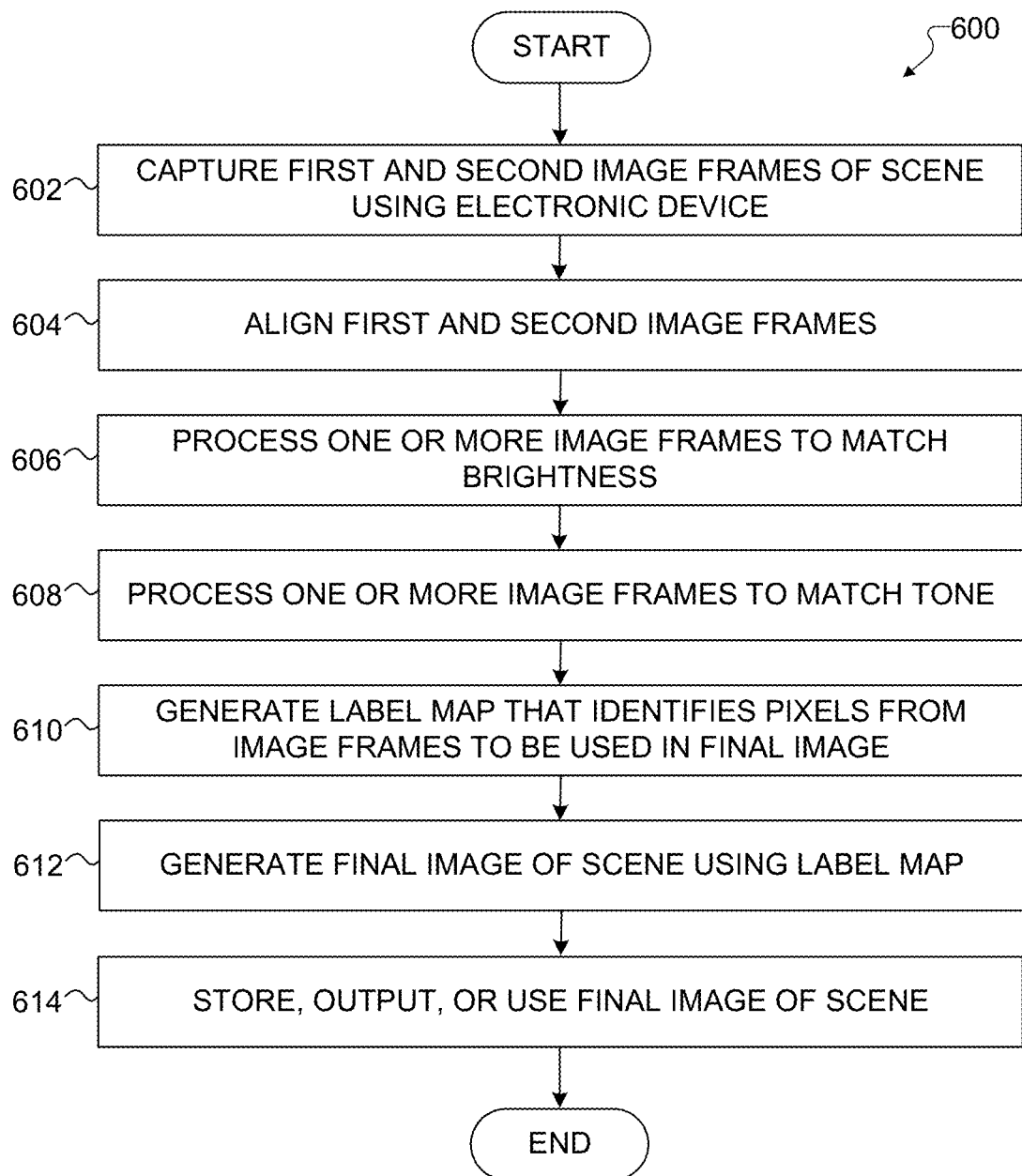
FIG. 6 illustrates an example method for HDR image creation of a dynamic scene using graph cut-based labeling in accordance with this disclosure.

FIG. 6 illustrates an example method 600 for HDR image creation of a dynamic scene using graph cut-based labeling in accordance with this disclosure. For ease of explanation, the method 600 shown in FIG. 6 is described as involving the performance of the process 200 shown in FIG. 2 using the electronic device 101 shown in FIG. 1. However, the method 600 shown in FIG. 6 could be used with any other suitable electronic device and in any suitable system.

As shown in FIG. 6, first and second image frames of a scene are captured using an electronic device at step 602. This could include, for example, the processor 120 of the electronic device 101 causing at least one camera of the electronic device 101 to capture image frames 202 and 204 of a scene. This could also include the processor 120 of the electronic device 101 controlling the camera(s) to use different exposure times when capturing the image frames 202 and 204. Note that the shorter-exposure image frame may be captured before, at the same time as, or after the auto-exposure or other longer-exposure image frame.

The first and second image frames can be pre-processed in any suitable manner. For example, the first and second image frames can be aligned at step 604, one or more of the image frames can be processed so that the image frames have substantially similar brightness at step 606, and one or more of the image frames can be processed so that the image frames have substantially similar tones at step 608. This could include, for example, the processor 120 of the electronic device 101 selecting one of the image frames 202 and 204 as a reference image frame and modifying the other of the image frames 204 and 202 to align with the reference image frame. This could be done in any suitable manner, such as by using feature point detection and matching and block searching. This could also include the processor 120 of the electronic device 101 performing histogram matching to substantially match the brightness of the aligned non-reference image frame to the brightness of the aligned reference image frame. This could further include the processor 120 of the electronic device 101 applying a global tone mapping curve to the aligned non-reference image frame in order to brighten darker areas and increase image contrast in that image frame. Note, however, that any other or additional pre-processing may occur here.

Figure 7:
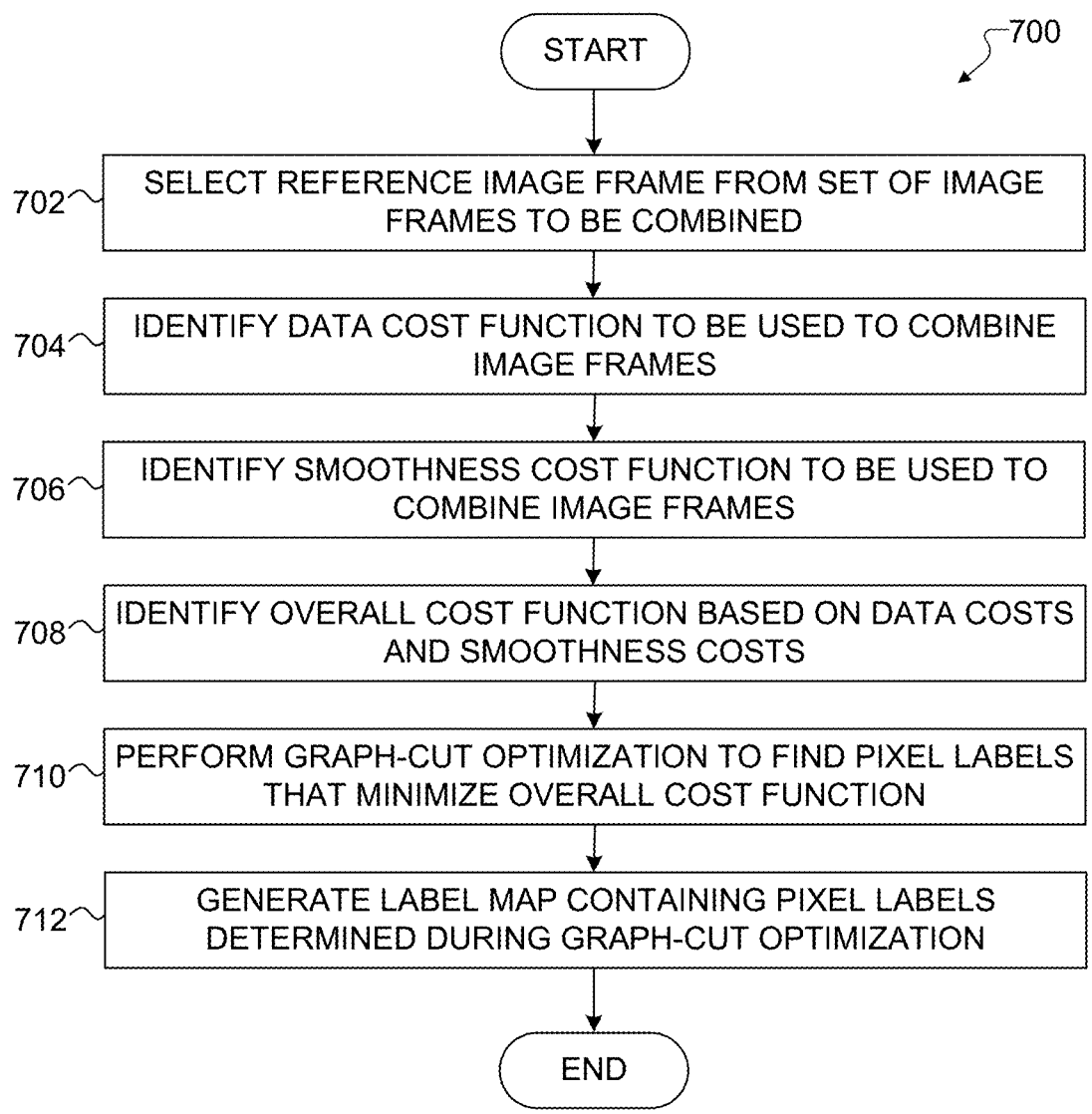
FIG. 7 illustrates an example method for graph cut-based labeling to support HDR image creation of a dynamic scene in accordance with this disclosure.

At least one label map identifying the pixels to be used from the different pre-processed image frames when generating a final image of the scene is generated at step 610. This could include, for example, the processor 120 of the electronic device 101 using a data cost function that considers both a motion metric indicating whether pixels in an image frame are associated with a moving object and a well-exposedness metric indicating whether pixels in an image frame are from well-exposed, over-exposed, or under-exposed regions. This could also include the processor 120 of the electronic device 101 using a smoothness cost function that considers how each pixel's neighbors are labeled. The resulting label map 218 contains discrete values indicating which image frame each pixel of the final image of the scene should be extracted from, such as by image number or other image identifier. One example implementation of step 610 is shown in FIG. 7, which is described below.

A final image of the scene is generated using the at least one label map at step 612. This could include, for example, the processor 120 of the electronic device 101 extracting pixels from the reference and non-reference image frames based on the values contained in the label map 218. The extracted pixels can be inserted into the final image 226 of the scene using blending or any other suitable operations. Note that any other desired image processing operations may also occur here to produce the final image 226 of the scene.

The final image of the scene can be stored, output, or used in some manner at step 614. This could include, for example, the processor 120 of the electronic device 101 displaying the final image 226 of the scene on the display 160 of the electronic device 101. This could also include the processor 120 of the electronic device 101 saving the final image 226 of the scene to a camera roll stored in a memory 130 of the electronic device 101. This could further include the processor 120 of the electronic device 101 attaching the final image 226 of the scene to a text message, email, or other communication to be transmitted from the electronic device 101. Of course, the final image 226 of the scene could be used in any other or additional manner.

Although FIG. 6 illustrates one example of a method 600 for HDR image creation of a dynamic scene using graph cut-based labeling, various changes may be made to FIG. 6. For example, while shown as a series of steps, various steps in FIG. 6 could overlap, occur in parallel, occur in a different order, or occur any number of times.

FIG. 7 illustrates an example method 700 for graph cut-based labeling to support HDR image creation of a dynamic scene in accordance with this disclosure. For ease of explanation, the method 700 shown in FIG. 7 is described as forming part of the process 200 shown in FIG. 2, which is performed using the electronic device 101 shown in FIG. 1. However, the method 700 shown in FIG. 7 could be used with any other suitable electronic device and in any suitable system.

As shown in FIG. 7, a reference image frame is selected from a set of image frames to be combined at step 702. This could include, for example, the processor 120 of the electronic device 101 typically selecting an auto-exposure or other longer-exposure image frame as the reference image frame in most instances. This could also include the processor 120 of the electronic device 101 performing a preliminary analysis to determine if any saturated regions of the longer-exposure image frame are occluded in a shorter-exposure image frame and, if so, selecting the shorter-exposure image frame as the reference image frame.

A data cost function to be used to combine the image frames is identified at step 704, and a smoothness cost function to be used to combine the image frames is identified at step 706. This could include, for example, the processor 120 of the electronic device 101 using the appropriate data cost function and the appropriate smoothness cost function discussed above, which can vary based on which image frame is selected as the reference image frame. An overall cost function to be used to combine the image frames is identified at step 708. This could include, for example, the processor 120 of the electronic device 101 using the identified data cost function and the identified smoothness cost function in some combination (such as an inverse product) as the overall cost function.

A graph-cut optimization is performed using the overall cost function to identify pixel labels that minimize the overall cost function at step 710. This could include, for example, the processor 120 of the electronic device 101 using one of various graph-cut optimization algorithms to find the labels for the pixels that minimize the overall cost function. As noted above, part of this step can include using a value of the A parameter to balance between data costs and smoothness costs. A label map is generated using the identified pixel labels at step 712. This could include, for example, the processor 120 of the electronic device 101 generating a label map 218 that includes a discrete value for each pixel to be included in a final image of the scene, where each discrete value identifies the image frame from which the associated pixel will be extracted.

Although FIG. 7 illustrates one example of a method 700 for graph cut-based labeling to support HDR image creation of a dynamic scene, various changes may be made to FIG. 7. For example, while shown as a series of steps, various steps in FIG. 7 could overlap, occur in parallel, occur in a different order, or occur any number of times.

In the description above, one example process for providing occluded saturation region recovery involves swapping the reference and non-reference image frames. However, as noted above, this can result in a lower image quality for a final image of a scene, since the image frame being used as the reference image frame has a shorter exposure (and therefore fewer image details) than the non-reference image frame. The following description describes modifications to the approaches described above, where these modifications use a specific image frame capture order and image frame exposure settings to recover one or more occluded saturation regions without degrading image quality, particularly when considering motion along one direction (which is commonly seen in the real world, such as with walking pedestrians, moving vehicles, and waving hands). These modified approaches are still built on the labeling functionality described above, but the associated cost function can be modified for this use case as described below.

In general, three modified approaches described below involve the capture of at least three image frames, where an auto-exposure or other longer-exposure image frame is captured between captures of different shorter-exposure image frames (which can be captured using the same exposure). The longer-exposure image frame is used as the reference image frame to maintain image quality, and any saturated regions in the reference image frame that are occluded in one or more of the shorter-exposure image frames can be recovered from one or more other shorter-exposure image frames. Since a discussion of capturing image frames is provided above, the following discussion focuses on how three or more image frames can be combined using at least one label map.

FIGS. 8A, 8B, 8C, 8D, 8E, 8F, and 8G illustrate a first example technique for occluded saturation recovery for use in producing an HDR image of a dynamic scene using graph cut-based labeling in accordance with this disclosure. In particular, FIGS. 8A, 8B, 8C, 8D, 8E, 8F, and 8G illustrate how three image frames of a scene can be combined using the same type of labeling approach discussed above, where the scene includes a person waving his hand in the foreground. For ease of explanation, FIGS. 8A, 8B, 8C, 8D, 8E, 8F, and 8G are described as involving the performance of the process 200 shown in FIG. 2 using the electronic device 101 shown in FIG. 1, although any other suitable electronic device in any suitable system may be used here.

Figure 8A:
FIGS. 8A, 8B, 8C, 8D, 8E, 8F, and 8G illustrate a first example technique for occluded saturation recovery for use in producing an HDR image of a dynamic scene using graph cut-based labeling in accordance with this disclosure.
Figure 8B:
Figure 8C:
Figure 8D:
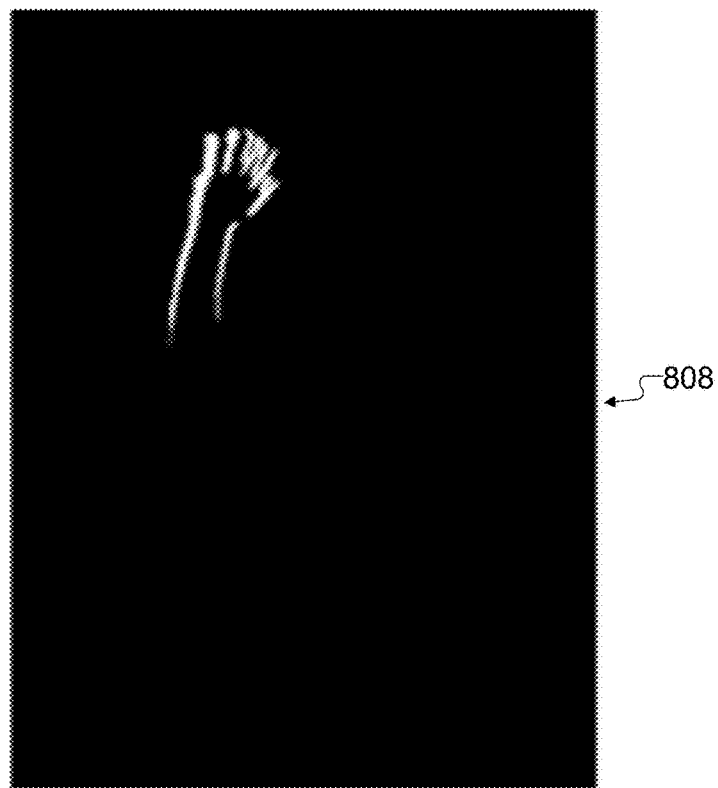
Figure 8E:

As shown in FIGS. 8A, 8B, and 8C, three image frames 802, 804, and 806 of the scene are captured. The image frames 802 and 806 in FIGS. 8A and 8C are shorter-exposure image frames, and the image frame 804 in FIG. 8B is an auto-exposure or other longer-exposure image frame. The arrows in FIGS. 8A and 8C are not actually part of the captured image frames 802 and 806 but instead are meant merely to illustrate movement of the person's hand. Because the image frame 804 has a longer exposure than the image frames 802 and 806, the image frame 804 is brighter and includes greater image detail in most areas, but a portion of the background in the image frame 804 is over-exposed. Because each of the image frames 802 and 806 has a shorter exposure than the image frame 802, the image frames 802 and 806 are darker and include less image detail in most areas, but the over-exposed portion of the background from the image frame 804 is well-exposed in the image frames 802 and 806.

Since the person is waving his hand while the image frames 802-806 are being captured, part of the saturated region from the image frame 804 is occluded by the person's arm in the image frame 802, and part of the saturated region from the image frame 804 is occluded by the person's arm in the image frame 806. However, it is possible to recover image details for part of the saturated region in the image frame 804 from the image frame 802 and to recover image details for another part of the saturated region in the image frame 804 from the image frame 806.

In this first example technique for merging at least three image frames to achieve occluded saturation region recovery, at least two shorter-exposure image frames are combined together using a first labeling operation to produce a composite image frame. After that, the composite image frame (which still has a shorter exposure) is combined with the longer-exposure image frame using a second labeling operation. To support this, denote three input image frames as $I_0$, $I_1$, and $I_2$, where $I_0$ and $I_2$ are the shorter-exposure image frames and $I_1$ is the auto-exposure or other longer-exposure image frame captured in between the image frames $I_0$ and $I_2$. A difference map $D_{ij}=D_{ji}$ can be computed between image frames $I_i$ and $I_j$ according to Equations (3)-(6) above, such as when $D_{01}$ is computed between image frames $I_0$ and $I_1$ or when $D_{12}$ is computed between image frames $I_1$ and $I_2$. However, as a modification to Equations (3)-(6), the color saturation metric S of Equation (5) can be replaced by a constant value if two image frames $I_i$ and $I_j$ have the same exposure setting.

A label map is generated between the two shorter-exposure image frames $I_0$ and $I_2$ (which have equal exposure settings), so the use of the well-exposedness metric is not necessary. Instead, the design of the scene consistency metric P can favor one of the shorter-exposure image frames $I_0$ or $I_2$ in most regions, except for an occluded saturation region. A selection scheme between the two shorter-exposure image frames $I_0$ and $I_2$ can therefore be implemented to decrease the size of a potential occluded saturation region and consequently decrease processing time. Assuming that the first shorter-exposure image frame $I_0$ is selected as the dominant shorter-exposure image frame, an occluded saturation map can be defined as the intersection of a motion map and a saturation map. For example, a threshold can be applied on the difference map $D_{01}$ to generate a binary motion map, and the saturation map $SAT_1$ of the longer-exposure image frame $I_1$ can be generated as described above. Given this, an occluded saturation map MOVSAT can be expressed as:

$$\text{MOVSAT} = (D_{01} > E_m) \cap (\text{SAT}_1) \tag{20}$$

where $E_m$ represents a difference threshold. For most regions, the scene consistency metric P of the first shorter-exposure image frame $I_0$ can be doubled to eliminate noise influences. For any occluded saturation region, the scene consistency metric P may favor the second shorter-exposure image frame $I_2$ to recover the region occluded in the first shorter-exposure image frame $I_0$. Note that the difference signal $D_{01}$ in Equation (20) is expressed between a shorter-exposure image frame and the longer-exposure image frame (the reference image frame). Overall, this can be summarized as:

$$P(I_0(p)) = \begin{cases} \left(e^{-\frac{D_{01}(p)^2}{2\sigma_c^2}}\right)^2 & \text{if } MOVSAT = 1 \\ 2 * \left(e^{-\frac{D_{01}(p)^2}{2\sigma_c^2}}\right)^2 & \text{if } MOVSAT = 0 \end{cases} \tag{21}$$

$$P(I_2(p)) = \begin{cases} 2 * \left(e^{-\frac{D_{12}(p)^2}{2\sigma_c^2}}\right)^2 & \text{if } MOVSAT = 0 \\ \left(e^{-\frac{D_{12}(p)^2}{2\sigma_c^2}}\right)^2 & \text{if } MOVSAT = 1 \end{cases} \tag{22}$$

The smoothness cost is almost the same and can be expressed as:

$$SC(p, p') = \frac{D_{02}(p) + D_{02}(p')}{\partial_* Y_1(p)} \tag{23}$$

where the difference signal $D_{02}$ in the numerator is determined between the two shorter-exposure image frames (as the label map will select either the first shorter-exposure image frame or the second shorter-exposure image frame and merge them together), and the edge map only comes from the reference image frame.

An example of this technique is shown in FIGS. 8D, 8E, 8F, and 8G. More specifically, the shorter-exposure image frames 802 and 806 are used by the labeling operation 216 as described above to generate a label map 808 shown in FIG. 8D, and the label map 808 can be used by the blending operation 224 to combine the shorter-exposure image frames 802 and 806 into a composite image frame 810 shown in FIG. 8E. The composite image frame 810 lacks image details (particular with respect to the person's moving arm), but the composite image frame 810 does include image details in the regions of the scene that are saturated in the image frame 804.

Figure 8F:
Figure 8G:
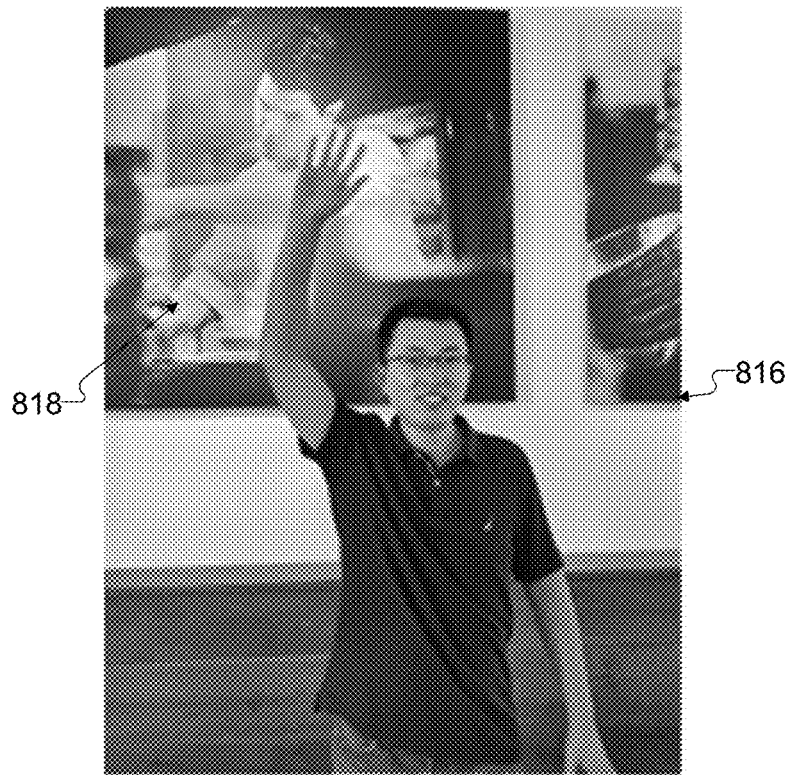

FIG. 8F illustrates a final image 812 produced using one shorter-exposure image frame and one longer-exposure image frame. As can be seen here, at least one region 814 of the final image 812 lacks detail due to the saturation of the same region in the longer-exposure image frame 804. FIG. 8G illustrates a final image 816 produced by processing the composite image frame 810 and the image frame 804 using the process 200 described above, where the image frame 804 is used as a reference image frame since it has a longer exposure. As can be seen here, a region 818 in FIG. 8G contains much more image detail compared to the corresponding region 814 in FIG. 8F. Thus, as shown here, this first approach helps to achieve high dynamic range and recover image details as a part of occluded saturation recovery.

Figure 9:
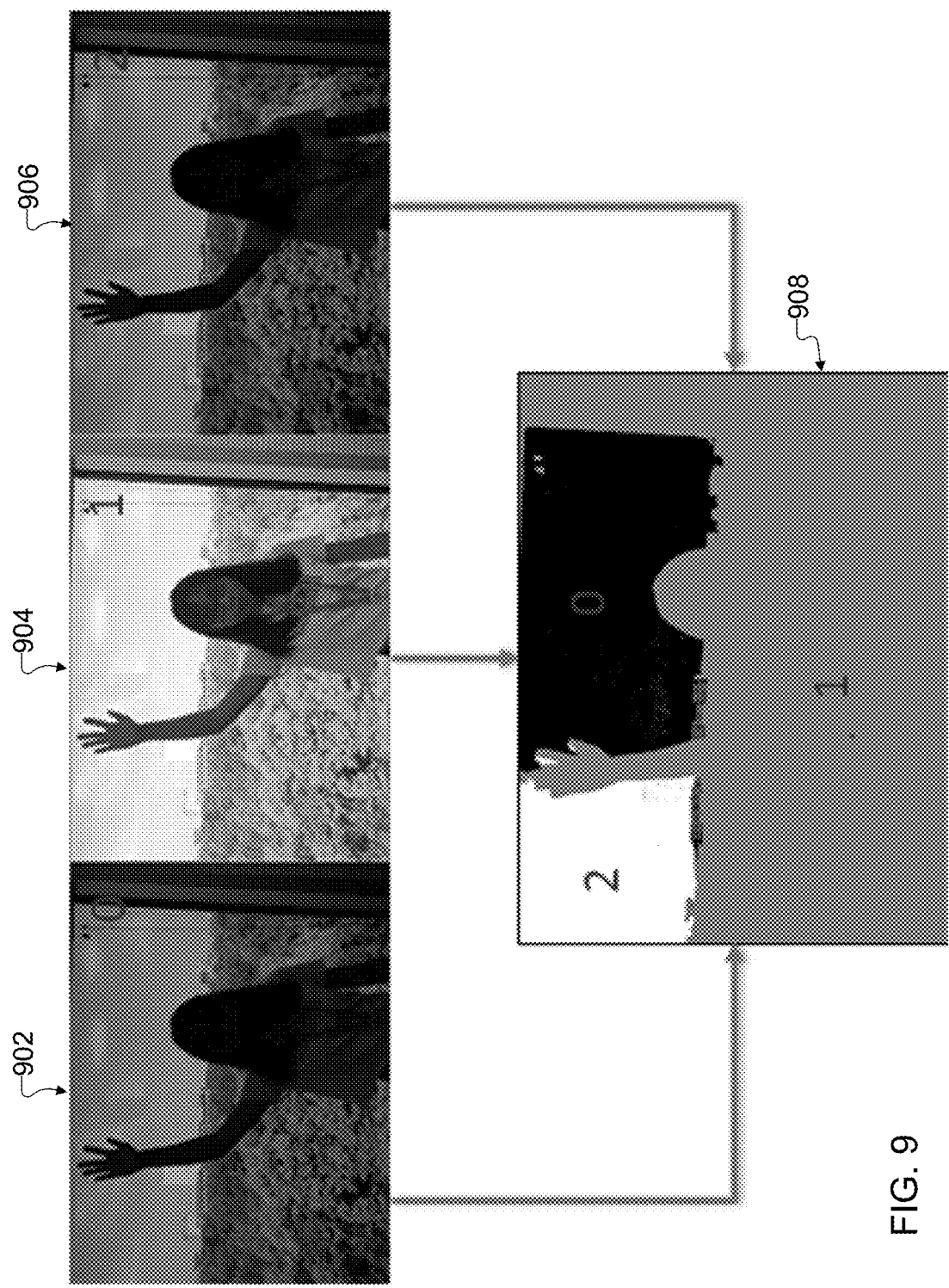
FIG. 9 illustrates a second example technique for occluded saturation recovery for use in producing an HDR image of a dynamic scene using graph cut-based labeling in accordance with this disclosure.

FIG. 9 illustrates a second example technique for occluded saturation recovery for use in producing an HDR image of a dynamic scene using graph cut-based labeling in accordance with this disclosure. In particular, FIG. 9 illustrates how three image frames of a scene can be combined using the same type of labeling approach discussed above, where the scene includes a person waving her hand in the foreground. For ease of explanation, FIG. 9 is described as involving the performance of the process 200 shown in FIG. 2 using the electronic device 101 shown in FIG. 1, although any other suitable electronic device in any suitable system may be used here.

As shown in FIG. 9, three image frames 902, 904, and 906 of the scene are captured. The image frames 902 and 906 in FIG. 9 are shorter-exposure image frames, and the image frame 904 in FIG. 9 is an auto-exposure or other longer-exposure image frame. Because the image frame 904 has a longer exposure than the image frames 902 and 906, the image frame 904 is brighter and includes greater image detail in most areas, but a portion of the background in the image frame 904 is over-exposed. Because each of the image frames 902 and 906 has a shorter exposure than the image frame 904, the image frames 902 and 906 are darker and include less image detail in most areas, but the over-exposed portion of the background from the image frame 904 is well-exposed in the image frames 902 and 906.

Since the person is waving her hand while the image frames 902-906 are being captured, part of the saturated region from the image frame 904 is occluded by the person's arm in the image frame 902, and part of the saturated region from the image frame 904 is occluded by the person's arm in the image frame 906. Again, however, it is possible to recover image details for part of the saturated region in the image frame 904 from the image frame 902 and to recover image details for another part of the saturated region in the image frame 904 from the image frame 906.

In this second example technique for merging at least three image frames to achieve occluded saturation region recovery, all three image frames are combined in a single pass by modifying the labeling operation 216 to perform a three-way labeling and generate a three-way label map 908 having three discrete values. In FIG. 9, the three discrete values in the label map 908 are represented by the colors black (identifying pixels in the image frame 902), gray (identifying pixels in the image frame 904), and white (identifying pixels in the image frame 906). In order to support this, the overall cost function used by the labeling operation 216 can be extended naturally as follows:

$$W(I_0(p)) = Y_0(p) \tag{24}$$

$$W(I_1(p)) = \begin{cases} M & \text{if } I_1(p) \text{ is saturated} \\ Y_1(p) & \text{otherwise} \end{cases} \tag{25}$$

$$W(I_2(p)) = Y_2(p) \tag{26}$$

$$P(I_0(p)) = \left(e^{-\frac{D_{01}(p)^2}{2\sigma_c^2}}\right)^2 \tag{27}$$

$$P(I_1(p)) = 1 \tag{28}$$

$$P(I_2(p)) = \left(e^{-\frac{D_{12}(p)^2}{2\sigma_c^2}}\right)^2 \tag{29}$$

-continued $$SC(p, p', i, j) = \frac{D_{ij}(p) + D_{ij}(p')}{\partial_* Y_i(p) + \partial_* Y_j(p)},$$
$$i = j, i, j = 0, 1, 2$$
(30)

In the example shown in FIG. 9, the label map 908 uses pixels from the image frame 902 for use on the right side of the person's hand in a final image, since that portion of the scene is fully visible in the image frame 902. Similarly, the label map 908 uses pixels from the image frame 906 for use on the left side of the person's hand in the final image, since that portion of the scene is fully visible in the image frame 906. Thus, this second approach again helps to achieve high dynamic range and recover image details as a part of occluded saturation recovery.

Figure 10:
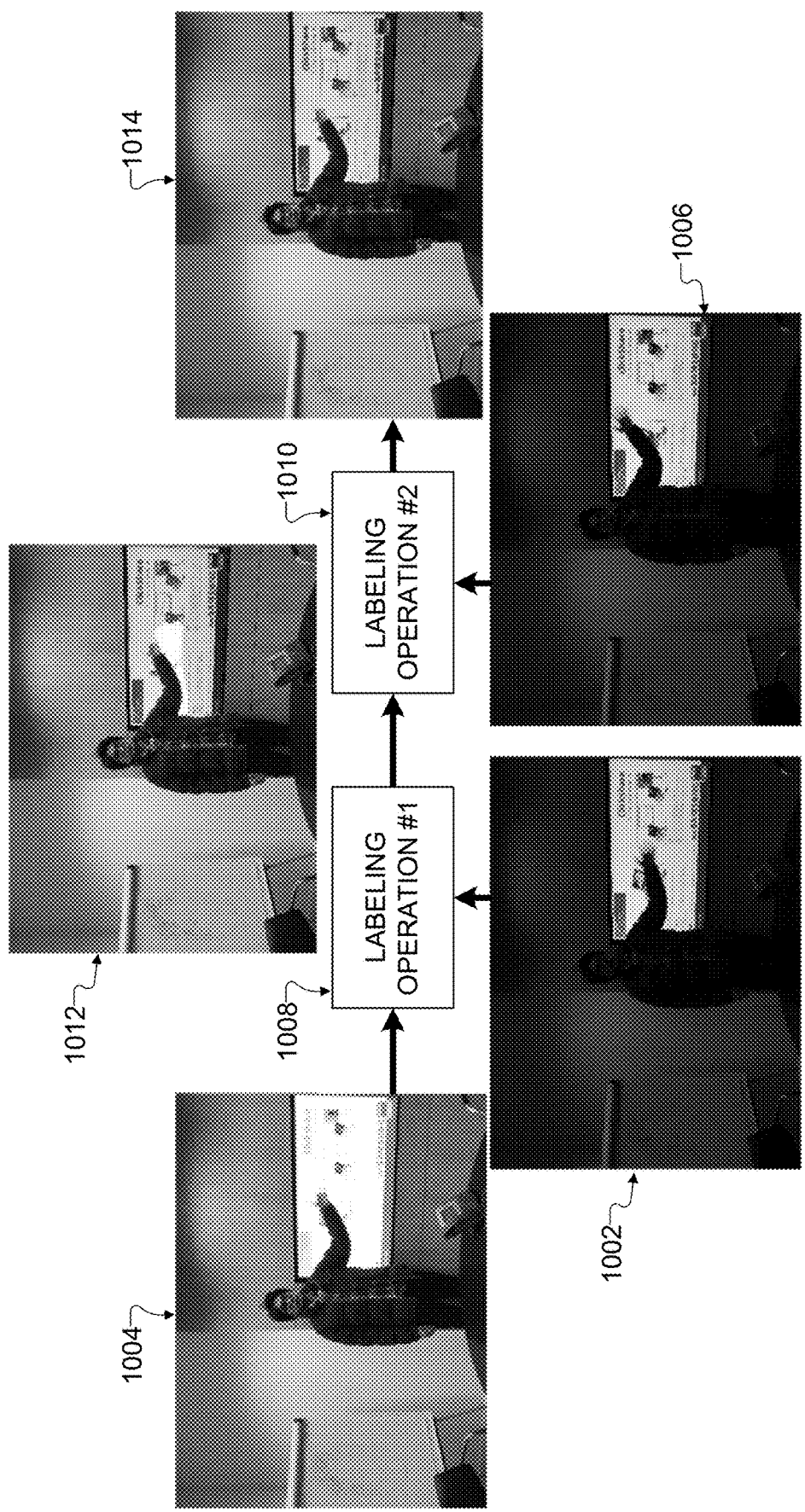
FIG. 10 illustrates a third example technique for occluded saturation recovery for use in producing an HDR image of a dynamic scene using graph cut-based labeling in accordance with this disclosure.

FIG. 10 illustrates a third example technique for occluded saturation recovery for use in producing an HDR image of a dynamic scene using graph cut-based labeling in accordance with this disclosure. In particular, FIG. 10 illustrates how three image frames of a scene can be combined using the same type of labeling approach discussed above, where the scene includes a person moving his arm in the foreground. For ease of explanation, FIG. 10 is described as involving the performance of the process 200 shown in FIG. 2 using the electronic device 101 shown in FIG. 1, although any other suitable electronic device in any suitable system may be used here.

As shown in FIG. 10, three image frames 1002, 1004, and 1006 of the scene are captured. The image frames 1002 and 1006 in FIG. 10 are shorter-exposure image frames, and the image frame 1004 in FIG. 10 is an auto-exposure or other longer-exposure image frame. Because the image frame 1004 has a longer exposure than the image frames 1002 and 1006, the image frame 1004 is brighter and includes greater image detail in most areas, but a portion of the background in the image frame 1004 related to a display device is over-exposed. Because each of the image frames 1002 and 1006 has a shorter exposure than the image frame 1004, the image frames 1002 and 1006 are darker and include less image detail in most areas, but the over-exposed portion of the background related to the display device from the image frame 1004 is well-exposed in the image frames 1002 and 1006.

Since the person is moving his arm while the image frames 1002-1006 are being captured, part of the saturated region from the image frame 1004 is occluded by the person's arm in the image frame 1002, and part of the saturated region from the image frame 1004 is occluded by the person's arm in the image frame 1006. Once again, however, it is possible to recover image details for part of the saturated region in the image frame 1004 from the image frame 1002 and to recover image details for another part of the saturated region in the image frame 1004 from the image frame 1006.

In this third example technique for merging at least three image frames to achieve occluded saturation region recovery, the image frame 1004 is sequentially combined with the two image frames 1002 and 1006 using sequential labeling operations 1008 and 1010. While the three-way merge approach described above with respect to FIG. 9 may be provably optimal, that approach involves solving a larger optimization problem, which might take a significant amount of time to converge (particularly on a mobile device). To strike a balance between speed and quality, the third approach here uses multiple labeling operations performed sequentially with the same objective, namely saturation recovery using the right information from a shorter-exposure image frame.

In the process shown here, the labeling operation 1008 can occur in the same or similar manner as described above using the image frames 1002 and 1004, and the results of the labeling operation 1008 can be used to generate a composite image frame 1012. The labeling operation 1010 can then occur in the same or similar manner as described above using the image frames 1012 and 1006, and the results of the labeling operation 1010 can be used to generate a final image 1014 of the scene. The final image 1014 recovers more image detail in the background while maintaining the higher image quality from the longer-exposure image frame 1004. Thus, this third approach again helps to achieve high dynamic range and recover image details as a part of occluded saturation recovery.

It should be noted here that the process shown in FIG. 10 can be easily generalized for use with more than two shorter-exposure image frames. The first labeling operation in the sequence can involve the auto-exposure or other longer-exposure image frame and one of the shorter-exposure image frames. Each subsequent labeling operation can use the composite image frame produced using the previously-generated label map and another one of the shorter-exposure image frames, which helps to recover as much image detail as possible from any (remaining) saturated regions. Each intermediate output (composite image frame) is forwarded to the next labeling operation with the next available shorter-exposure image frame, which can be repeated until there are no more saturated regions to be recovered or there are no more shorter-exposure image frames to be processed. It should also be noted here that the process shown in FIG. 10 may achieve faster convergence speeds that the other two approaches described above, since the speed of the process in FIG. 10 only grows linearly (as opposed to exponentially) as the number of input shorter-exposure image frames increases. However, any of the approaches described here can be used to support occluded saturation region recovery.

Although FIGS. 8A through 10 illustrate examples of techniques for occluded saturation recovery for use in producing an HDR image of a dynamic scene using graph cut-based labeling, various changes may be made to FIGS. 8A through 10. For example, FIGS. 8A through 10 are merely meant to illustrate examples of the types of results that could be obtained using the three approaches for occluded saturation region recovery described above. Obviously, images of scenes can vary widely, and the results obtained using these three approaches can also vary widely depending on the circumstances. Also, the results obtained in FIGS. 8A through 10 may vary even for the same images as shown in FIGS. 8A through 10, such as based on various parameters used in the labeling operation(s).

Note that while the labeling functionality is described above as being used to combine longer-exposure and shorter-exposure image frames to generate HDR images, the same labeling functionality can be used in other applications, and the cost function used by the labeling functionality can be modified as needed for those other applications. For example, the labeling functionality can be used during the generation of HDR video sequences. In one implementation, the labeling functionality described above can be used to generate HDR effects in every frame of a video sequence being captured. In another implementation, the labeling functionality described above can be used to generate HDR effects in a subset of sample frames (such as in every tenth frame) of a video sequence being captured, and the label map for each sample frame can be populated to neighboring frames using motion information (such as optical flow) in order to produce HDR effects in the neighboring frames.

As another example, the labeling functionality described above can be used to generate HDR panoramic images. Here, multiple image frames can be captured at varying orientations and exposures across a panoramic scene. A set of geometrically-aligned auto-exposure or other longer-exposure images at varying orientations can be used to create a reference panoramic image that covers the desired angular extent of the panoramic scene. The dynamic range of the reference panoramic image can then be extended using a set of shorter-exposure image frames using the same approaches described above for generating HDR images.

As yet another example, the labeling functionality described above can be used to support low-light image enhancement, such as when different image frames are combined to reduce motion blur. As still another example, the labeling functionality described above can be used to support array camera processing in which image frames from an array of cameras can be processed to produce HDR images (possibly individually or in a video sequence). In general, the labeling functionality described above can be used in any suitable application to improve the dynamic range of images, with or without support for occluded saturation region recovery.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining multiple image frames of a scene using at least one sensor of an electronic device, the multiple image frames including a first image frame, a second image frame having a longer exposure than the first image frame, and a third image frame having a shorter exposure than the second image frame, the second image frame captured in between the first and third image frames;
   generating at least one label map that identifies pixels in the multiple image frames that are to be used in an image of the scene; and
   generating the image of the scene using the pixels extracted from the image frames based on the at least one label maps;
   wherein part of the first image frame corresponds to part of a saturated region of the second image frame and represents an occluded region that is blocked by at least one moving object in the first image frame; and
   wherein generating the image of the scene comprises recovering image details in the part of the saturated region of the second image frame using a corresponding part of the third image frame.

2. The method of claim 1, wherein:
   the at least one label map comprises multiple labels; and
   each label is associated with at least one corresponding pixel and comprises a discrete value that identifies one of the multiple image frames from which the at least one corresponding pixel is extracted.

3. The method of claim 1, wherein:
   generating the at least one label map comprises minimizing an overall cost function that is based on a data cost function and a smoothness cost function;
   the data cost function jointly considers motion and well-exposedness; and
   the smoothness cost function considers how each pixel's neighbors are labeled.

4. The method of claim 3, wherein generating the at least one label map comprises performing a graph-cut optimization to identify labels in the at least one label map that minimize the overall cost function.

5. The method of claim 1, wherein;
   the at least one label map comprises first and second label maps; and
   generating the image of the scene comprises:
      combining the first and third image frames to produce a composite image frame using the first label map; and
      combining the second image frame and the composite image frame using the second label map.

6. The method of claim 1, wherein;
   the at least one label map comprises a three-way label map; and
   generating the image of the scene comprises combining the first, second, and third image frames using the three-way label map.

7. The method of claim 1, wherein;
   the at least one label map comprises first and second label maps; and
   generating the image of the scene comprises:
      combining the first and second image frames to produce a composite image frame using the first label map; and
      combining the composite image frame and the third image frame using the second label map.

8. The method of claim 1, further comprising:
   aligning multiple captured image frames to produce at least first and second aligned image frames;
   processing the first aligned image frame using histogram matching to generate a histogram-matched first aligned image frame; and
   processing the first aligned image frame using tone mapping to generate a tone-matched first aligned image frame;
   wherein generating the at least one label map comprises generating the at least one label map using the histogram-matched first aligned image frame and the second aligned image frame; and
   wherein generating the image of the scene comprises using the tone-matched first aligned image frame, the second aligned image frame, and the at least one label map.

9. The method of claim 1, wherein the first and third image frames have a common exposure.

10. The method of claim 1, wherein one of:
    the first image frame is captured before the second image and the third image frame is captured after the second image; or
    the first image frame is captured after the second image and the third image frame is captured before the second image.

11. The method of claim 1, wherein:
    the multiple image frames include at least one additional image frame having a shorter exposure than the second image frame;
    the at least one label map comprises multiple label maps;
    a first of the label maps is generating using two of the image frames; and
    each additional label map is generated using a composite image frame and another one of the image frames.

12. An electronic device comprising:
at least one sensor; and
at least one processing device configured to:
  obtain multiple image frames of a scene using the at least one sensor, the multiple image frames including a first image frame, a second image frame having a longer exposure than the first image frame, and a third image frame having a shorter exposure than the second image frame, the second image frame captured in between the first and third image frames;
  generate at least one label map that identifies pixels in the multiple image frames that are to be used in an image of the scene; and
  generate the image of the scene using the pixels extracted from the image frames based on the at least one label map;
wherein part of the first image frame corresponds to part of a saturated region of the second image frame and represents an occluded region that is blocked by at least one moving object in the first image frame; and
wherein, to generate the image of the scene, the at least one processing device is configured to recover image details in the part of the saturated region of the second image frame using a corresponding part of the third image frame.

13. The electronic device of claim 12, wherein the at least one sensor comprises at least one camera.

14. The apparatus of claim 12, wherein:
to generate the at least one label map, the at least one processing device is configured to minimize an overall cost function that is based on a data cost function and a smoothness cost function;
the data cost function jointly considers motion and well-exposedness; and
the smoothness cost function considers how each pixel's neighbors are labeled.

15. The apparatus of claim 14, wherein, to generate the at least one label map, the at least one processing device is configured to perform a graph-cut optimization to identify labels in the at least one label map that minimize the overall cost function.

16. The apparatus of claim 12, wherein:
the at least one label map comprises first and second label maps; and
to generate the image of the scene, the at least one processing device is configured to:
  combine the first and third image frames to produce a composite image frame using the first label map; and
  combine the second image frame and the composite image frame using the second label map.

17. The apparatus of claim 12, wherein:
the at least one label map comprises a three-way label map; and
to generate the image of the scene, the at least one processing device is configured to combine the first, second, and third image frames using the three-way label map.

18. The apparatus of claim 12, wherein:
the at least one label map comprises first and second label maps; and
to generate the image of the scene, the at least one processing device is configured to:
  combine the first and second image frames to produce a composite image frame using the first label map; and
  combine the composite image frame and the third image frame using the second label map.

19. A non-transitory machine-readable medium containing instructions that when executed cause at least one processor of an electronic device to:
  obtain multiple image frames of a scene using at least one sensor of the electronic device, the multiple image frames including a first image frame, a second image frame having a longer exposure than the first image frame, and a third image frame having a shorter exposure than the second image frame, the second image frame captured in between the first and third image frames;
  generate at least one label map that identifies pixels in the multiple image frames that are to be used in an image of the scene; and
  generate the image of the scene using the pixels extracted from the image frames based on the at least one label map;
wherein part of the first image frame corresponds to part of a saturated region of the second image frame and represents an occluded region that is blocked by at least one moving object in the first image frame; and
wherein the instructions that when executed cause the at least one processor to generate the image of the scene comprise instructions that when executed cause the at least one processor to recover image details in the part of the saturated region of the second image frame using a corresponding part of the third image frame.

20. The non-transitory machine-readable medium of claim 19, wherein the instructions that when executed cause the at least one processor to generate the image of the scene comprise:
instructions that when executed cause the at least one processor to recover image details in another saturated region of the second image frame using a corresponding portion of the first image frame.

21. The non-transitory machine-readable medium of claim 19, wherein:
the instructions that when executed cause the at least one processor to generate the at least one label map comprise instructions that when executed cause the at least one processor to minimize an overall cost function that is based on a data cost function and a smoothness cost function;
the data cost function jointly considers motion and well-exposedness; and
the smoothness cost function considers how each pixel's neighbors are labeled.

22. The non-transitory machine-readable medium of claim 21, wherein the instructions that when executed cause the at least one processor to generate the at least one label map comprise:
instructions that when executed cause the at least one processor to perform a graph-cut optimization to identify labels in the at least one label map that minimize the overall cost function.

23. The non-transitory machine-readable medium of claim 19, wherein:
the at least one label map comprises first and second label maps; and
the instructions that when executed cause the at least one processor to generate the image of the scene comprise instructions that when executed cause the at least one processor to:
  combine the first and third image frames to produce a composite image frame using the first label map; and
  combine the second image frame and the composite image frame using the second label map.

24. The non-transitory machine-readable medium of claim 19, wherein:
- the at least one label map comprises a three-way label map; and
- the instructions that when executed cause the at least one processor to generate the image of the scene comprise instructions that when executed cause the at least one processor to combine the first, second, and third image frames using the three-way label map.

25. The non-transitory machine-readable medium of claim 19, wherein:
- the at least one label map comprises first and second label maps; and
- the instructions that when executed cause the at least one processor to generate the image of the scene comprise instructions that when executed cause the at least one processor to:
  - combine the first and second image frames to produce a composite image frame using the first label map; and
  - combine the composite image frame and the third image frame using the second label map.

\* \* \* \* \*